Patented May 23, 1950

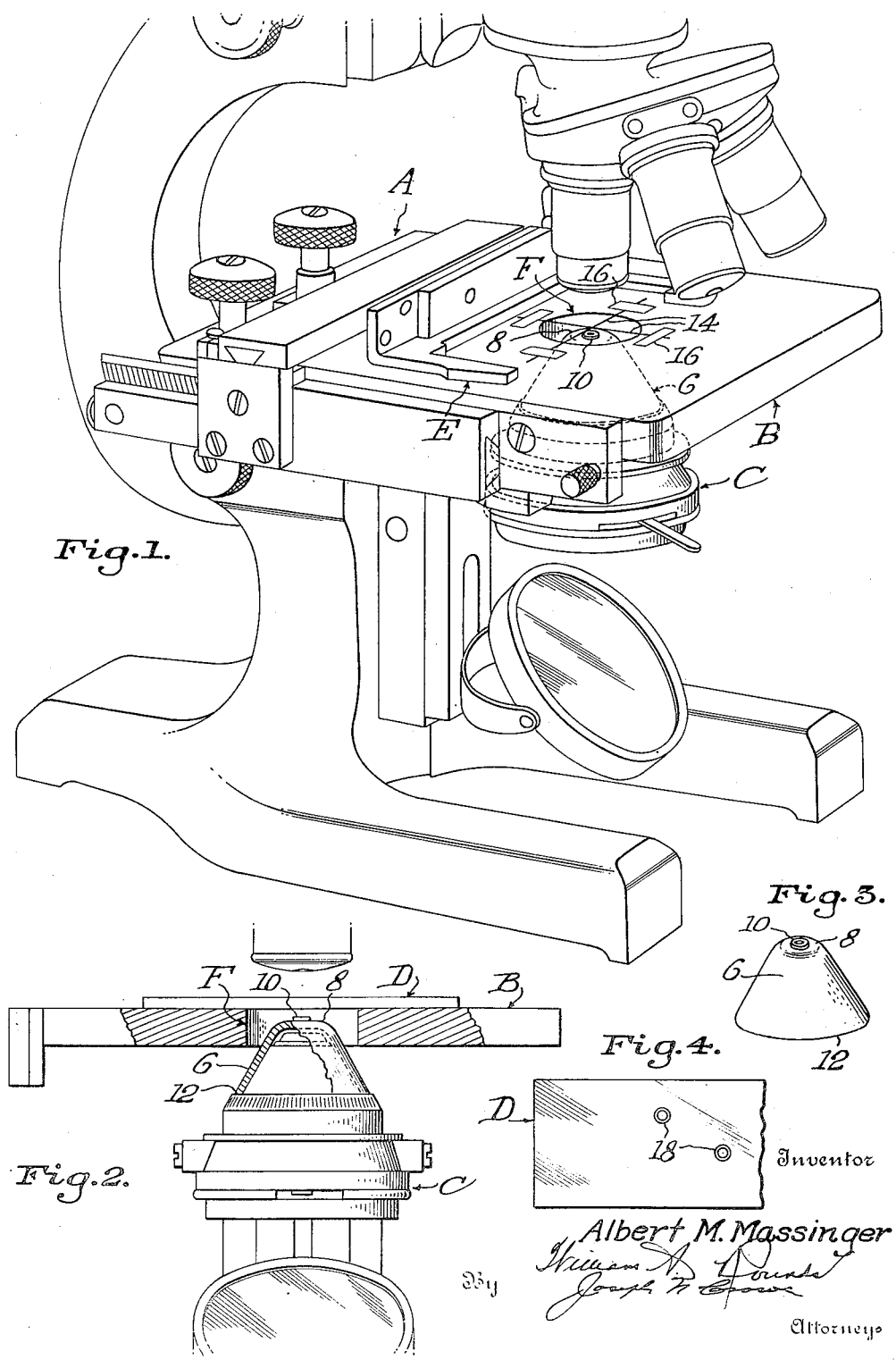

2,508,413

UNITED STATES PATENT OFFICE 2,508,413

MICROSCOPE SUBSTAGE SLIDE MARKER

Albert M. Massinger, Cleveland Heights, Ohio

Application January 16, 1947, Serial No. 722,362

4 Claims. (Cl. 88—40)

(Granted under the act of March 3, 1883, as amended April 30, 1928; 370 O. G. 757)

The invention described herein may be manufactured and used by or for the Government for governmental purposes, without payment to me of any royalty.

The present invention relates to improvements in attachments for microscopes, and relates more particularly to a substage slide marker whereby various portions of a microscope slide may be marked for identification by observation by the naked eye.

Various devices for this general purpose have been proposed and employed. However, the present construction offers the advantages of being composed of materials that are available readily in any laboratory, it being preferred to construct the improved marker from a thermoplastic resin, such as acrylic resin, although other materials may be employed, such as wood, metal, or glass. A resin offers the advantage, however, of being readily workable, and readily enabling the securing to the device of marking instrumentalities which may be provided with means for making a mark upon a glass microscope slide. Conveniently, the marking may be done by the application of an ink to the marking means, although other ways of marking the slide may be employed, such as scarifying the slide with a diamond point or the like.

The invention will be understood more readily from a consideration of the accompanying drawings, wherein:

Fig. 1 represents a fragmentary perspective view of a microscope provided with the substage marker of the present invention;

Fig. 2 is a fragmentary sectional elevation of the microscope stage and substage marker of the present invention;

Fig. 3 is a perspective view of the marking device of the invention; and

Fig. 4 is a fragmentary view of a microscope slide marked with the substage marking device of the present invention.

Referring more particularly to the drawings, reference character A represents generally a microscope of conventional design having a stage B and condenser C, which condenser is adjustable vertically in a conventional manner.

The substage marker of the present invention comprises a generally regular conical body 6 which has been molded or otherwise shaped in any suitable manner, for example in the manner to be described more particularly hereinafter. As has been pointed out above, the body 6 preferably is made of a thermoplastic synthetic resin, such as acrylic resin for example, and is formed with a substantially planar apex 8 to which is secured in any suitable manner marking indicia 10. Where the conical body 6 is composed of acrylic resin, the marking indicia conveniently is applied by softening the body of the cone adjacent the apex with a suitable solvent, impressing the marking indicia on the resulting softened surface, which then is allowed to harden to retain the indicia securely embedded in the plastic material of the conical body, but having the contour of the indicia exposed for the application of a suitable marking medium, for example an ink to the indicia. Conveniently, the indicia may be the letter "o" from a rubber stamp. The body 6 is mounted for service on the microscope condenser C, in such manner that the marking indicia with the marking medium applied thereto may be contacted with the underside of a microscope slide D mounted on stage B under the conventional holding clips E.

Where the substage marker 6 of the present invention is composed of moldable material, such as a thermoplastic resin, or glass, the molding may be carried out in accordance with the routine procedure employed in acrylic dental prostheses. Thus, after the condenser is removed from the microscope, dental wax is molded around it. The condenser is removed from the wax, and the resulting wax impression is invested in plaster of Paris, in dental flasks, and allowed to set. The wax is melted out with boiling water and replaced with fluid acrylic resin, or other moldable material in fluid condition. The resin or other material is cured or hardened under clamp pressure with boiling water for about thirty minutes.

The resulting molded form is removed from the plaster of Paris investment and cut or otherwise shaped to allow it to rest on the most suitable ledge of the condenser. This provides a firm support for the molded shape, which is a substantially regular cone, as shown in Fig. 3. The top 8 of the cone is flattened in any suitable manner such as by the use of sand paper or other fine abrasive, which also may be employed to smooth the supporting edge 12 of the body 6.

Where the body 6 is made of a plastic resin, the flattened top 8 is rendered soft and plastic by application of a suitable solvent, such as chloroform. The marking indicia 10 is applied to the resulting softened surface and embedded therein sufficiently to be supported thereon. As has been mentioned above, the marking indicia conveniently may be the letter "o" from a rubber stamp. This indicia is centered roughly on the soft and plastic top of the cap, which then is allowed to harden.

For centering the resulting assembly relative to the light aperture F in the stage B, cross hairs 14 are taped by strips of adhesive tape 16 to the stage of the microscope and are centered at right angles over the aperture F, as viewed under the high power objective of the microscope. The condenser with the marking body 6 thereon is re-mounted on the microscope, and by raising the condenser to the point where the marking indicia 10 contacts the intersection of the cross hairs 14, the marking indicia 10 can be moved to the exact center of the aperture F. If necessary, the top 8 of the marking body 6 may be re-softened by additional solvent in order to adjust the marking indicia 10 to the exact center of the aperture F. After the exact center is found, the surface 8 of the marking body 10 is allowed to harden and to dry, thus sealing the centered indicia 10 to the surface 8 of the cap or body 6.

Where the marking body 6 is composed of glass, the indicia 10 may be applied and secured by a suitable cement. The same applies if the cap 6 is composed of metal or wood. It may be mentioned in this connection that a light-transmitting material is preferable for the composition of the marking body 6, so as to enable adequate illumination of the slide and microscope objective employed in viewing the field on the slide. However, the invention contemplates the use of any materials that are found suitable for a given application, the material composing the body 6 not being critical for the purpose of the invention. When a marking medium is applied to the indicia 10, and the condenser raised until the indicia 10 contacts the underside of the slide D, there is left one or more markings 18 on the bottom of the slide for indicating to the naked eye any particular portion of the slide that may be desired to be examined specially thereafter, and there is thus indicated a more or less permanent marking on the slide.

Having thus described my invention, what I claim as new and wish to secure by Letters Patent is:

1. An attachment for a microscope adapted to mark predetermined portions of a microscopic field on a microscope slide, which comprises a microscope condenser mounted on a microscope stand beneath the light-transmitting aperture of a microscope stage, a substantially conical light-transmitting body mounted on the condenser, and adapted to transmit light from the condenser to an objective of the microscope aligned with the aperture, and marking means on the said conical body adapted to engage predetermined portions of the microscope slide responsively to adjustment of the condenser until the marking means contact the slide, the said marking means being centered relative to the light-transmitting aperture of the microscope stage and the objective.

2. An attachment for a microscope adapted to mark predetermined portions of a microscopic field on a microscope slide, which comprises a microscope condenser mounted on a microscope stand beneath the light-transmitting aperture of a microscope stage, a substantially conical light-transmitting marking body mounted on the condenser and transmitting light from the condenser through the aperture, and marking means embedded in the said conical body at the top thereof adapted to engage predetermined portions of the microscope slide responsively to adjustment of the condenser until the marking means contact the slide, the said marking means being centered relative to the light-transmitting aperture of the microscope stage and to a microscope objective centered relative to the aperture.

3. An attachment for a microscope adapted to mark predetermined portions of a microscopic field on a microscope slide, which comprises a microscope condenser mounted on a microscope stand beneath the light-transmitting aperture of a microscope stage, a substantially conical light-transmitting marking body mounted on the condenser for transmitting light from the condenser through the aperture to an objective centered relative to the aperture, the said body having a substantially planar top surface, and marking means embedded in the planar top surface of the marking body adapted to engage predetermined portions of the microscope slide responsively to adjustment of the condenser until the marking means contact the slide, the said marking means being centered relative to the light-transmitting aperture of the microscope stage and to the said objective.

4. A microscope comprising an objective, a stage having a viewing aperture therethrough, a substage condenser, and a marking device mounted on the condenser for marking a predetermined portion of a microscope slide placed over the aperture, the marking device comprising a substantially conical, light-transmitting body mounted on the condenser and having a substantially planar top surface at right angles to the vertical axis of the body, and a marking indicium mounted on the planar surface in vertical axial alignment with the objective and adapted to engage the slide underneath thereof with respect to the objective and stage responsively to upward movement of the condenser relative to the stage.

ALBERT M. MASSINGER.

REFERENCES CITED

The following references are of record in the file of this patent:

UNITED STATES PATENTS

| Number | Name | Date |
|--------|------|------|
| 872,391 | Vawter | Dec. 3, 1907 |
| 1,129,742 | Sheaff | Feb. 23, 1915 |
| 1,320,542 | Gilbert | Nov. 4, 1919 |
| 1,383,678 | Tillyer et al. | July 5, 1921 |
| 1,513,842 | Maynard | Nov. 4, 1924 |
| 1,630,659 | Hacker | May 31, 1927 |
| 1,800,209 | Christopherson | Apr. 14, 1931 |
| 1,860,430 | Poser | May 31, 1932 |
| 2,083,820 | Bissell | June 15, 1937 |
| 2,182,499 | Ott | Dec. 5, 1939 |
| 2,305,760 | Bernhardt | Dec. 22, 1942 |
| 2,404,888 | Richards | July 30, 1946 |